United States Patent
Imai

(10) Patent No.: US 9,691,120 B2
(45) Date of Patent: Jun. 27, 2017

(54) INTERFACE CIRCUIT AND DISPLAY DEVICE

(71) Applicant: Sharp Kabushiki Kaisha, Osaka (JP)

(72) Inventor: Masahiro Imai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 343 days.

(21) Appl. No.: 14/424,664

(22) PCT Filed: Aug. 28, 2013

(86) PCT No.: PCT/JP2013/073011
§ 371 (c)(1),
(2) Date: Feb. 27, 2015

(87) PCT Pub. No.: WO2014/038448
PCT Pub. Date: Mar. 13, 2014

(65) Prior Publication Data
US 2015/0221060 A1    Aug. 6, 2015

(30) Foreign Application Priority Data
Sep. 4, 2012   (JP) .................... 2012-194588

(51) Int. Cl.
| | |
|---|---|
| *G09G 3/20* | (2006.01) |
| *G06T 1/20* | (2006.01) |
| *H04L 25/02* | (2006.01) |
| *G09G 5/18* | (2006.01) |
| *G09G 3/36* | (2006.01) |

(52) U.S. Cl.
CPC ............ *G06T 1/20* (2013.01); *G09G 3/2096* (2013.01); *G09G 3/3685* (2013.01); *G09G 5/18* (2013.01); *H04L 25/0272* (2013.01); *G09G 3/36* (2013.01); *G09G 2370/08* (2013.01); *G09G 2370/14* (2013.01)

(58) Field of Classification Search
CPC .................. H04L 25/0272; G09G 2370/14
See application file for complete search history.

(56) References Cited

U.S. PATENT DOCUMENTS

| | | | |
|---|---|---|---|
| 2003/0001666 A1* | 1/2003 | Watanabe ........... | H03F 3/45237 327/563 |
| 2007/0230629 A1* | 10/2007 | Chang ................ | H04L 25/0272 375/340 |
| 2011/0096848 A1* | 4/2011 | Lam ................... | H04L 25/0272 375/257 |
| 2011/0140742 A1* | 6/2011 | Chen .................. | H04L 25/0272 327/65 |

(Continued)

FOREIGN PATENT DOCUMENTS

WO    2011/058715 A1    5/2011

*Primary Examiner* — Priyank Shah
(74) *Attorney, Agent, or Firm* — Chen Yoshimura LLP

(57) ABSTRACT

The interface circuit is provided with: a differential output circuit in which the output of a potential level of a differential signal stabilizes after a prescribed period from a start signal; and a counter circuit that performs control in such a manner that a data processing operation of a data processing unit is not performed on a signal based on the differential signal during the prescribed period. Thus, a liquid crystal display device that is capable of preventing a distorted video from being displayed in an initial drive period can be achieved.

13 Claims, 8 Drawing Sheets

(56) References Cited

U.S. PATENT DOCUMENTS

2011/0241432 A1* 10/2011 Nishioka ............. H04L 25/0272
   307/80
2011/0268198 A1* 11/2011 Nishioka ............. H04B 1/1615
   375/257
2011/0279934 A1* 11/2011 Guitton ............... H01L 27/0255
   361/56

* cited by examiner

INTERFACE CIRCUIT AND DISPLAY DEVICE

TECHNICAL FIELD

The present invention relates to an interface circuit for differential signal processing and a display device including the same.

BACKGROUND ART

In recent years, an interface circuit for differential signal processing has been widely adopted in various devices as a standard interface for data transmission because of its resistance to noise and high speed data transmission.

Below, the difference between a differential signal method and a single ended signal method is explained with reference to FIGS. 7 and 8.

FIG. 7(a) is a diagram illustrating a schematic configuration of an interface circuit for differential signal processing. FIG. 7(b) is a diagram illustrating a schematic configuration of an interface circuit for single ended signal processing.

As shown in FIG. 7(a), the differential signal method transfers a signal employing two signal lines and the potential difference between the above two signal lines that transmit the differential signals determines whether the signal is "H" or "L".

On the other hand, as illustrated in FIG. 7(b), the single ended signal method transfers a signal employing one signal line, and the potential difference from the ground (GND) determines whether the signal is "H" or "L".

FIG. 8(a) is a diagram illustrating an example of a differential signal pair that is generated on the transmission side of the interface circuit for differential signal processing shown in FIG. 7(a) and supplied to the two signal lines.

FIG. 8(b) is a diagram illustrating a signal that is generated on the reception side of the interface circuit for differential signal processing shown in FIG. 7(a) and is outputted.

As illustrated in FIG. 8(a), since the differential signal pair, which is supplied by the two signal lines, uses the potential difference between a pair of differential signals, a small amplitude is maintained, allowing high speed transmission.

Further, as illustrated in the diagram, because the potential difference between the differential signal pair is used, even if noise is generated in the two signal lines, the noise is canceled out, providing a method resistant to noise.

On the other hand, FIG. 8(c) is a diagram illustrating an example of a single ended signal.

As illustrated in the diagram, because the single ended signal uses the potential difference from the ground (GND), in order to output a signal with the same potential level as the differential signal method, the amplitude of the signal becomes relatively large, hindering high speed data transmission.

Moreover, in case of the single ended signal, unlike the differential signal method, noise generated in the signal line is not cancelled out, thus providing a method susceptible to noise.

For the above reasons, the differential signal method has been widely adopted as a standard interface for data transmission.

An amplitude and a center potential of the differential signal used in the above differential signal method can be set appropriately for each individual device and a terminating resistance value provided on the reception side of the interface circuit for differential signal processing can be set appropriately for each individual device.

Further, Patent Document 1 discloses an interface circuit that supports both the single ended and the differential signal communication methods as well as a pair of input terminals for the differential signal that also serves as an input/output terminal of the single ended signal.

Moreover, in the configuration of the above Patent Document 1, the differential signal reception circuit receiving the differential signals is activated by inputting the differential signal to a separate exclusive input terminal of the differential signal from a combination terminal that serves as the input terminal of the differential signal and the input/output terminal of the single ended signal, and the activation state after activation is maintained by a built-in controller.

Patent Document 1 describes that such a configuration can suppress the possibility of the differential signal reception circuit being terminated at an unintended timing.

RELATED ART DOCUMENT

Patent Document

Patent Document 1: WO 2011/058715 A1 (19 May 2011)

SUMMARY OF THE INVENTION

Problems to be Solved by the Invention

The potential level of the differential signal may be set at the potential level that does not include the GND level, if necessary.

For example, the potential level of the differential signal may be set so as to have a relatively large difference from the GND level.

As a specific example, if the center potential of the differential signal is set approximately at ½ of the power supply voltage of the reception side, an operation margin can be secured in both H and L sides within the input voltage range of the reception side, and noise in the common mode can be removed.

However, if the potential level of the differential signal is set so as to have a relatively large difference from the GND level, it takes time for an output state such as an output potential level to stabilize after a transmission unit that outputs the differential signal starts outputting in the interface circuit for differential signal processing.

The differential signal that is outputted from the transmission unit during an unstable output state tends to be unstable and susceptible to noise.

Therefore, the transmission unit may malfunction or enter an unexpected circuit operation state may be caused by superimposition of noise during such unstable activation.

However, no special consideration has been given for the malfunction or unexpected circuit operation state of the interface circuit caused by the superimposition of noise on the differential signals outputted from the transmission unit during the unstable output state in the conventional technology, including the above Patent Document 1, and in such a conventional configuration, the potential malfunction or unexpected circuit operation state occurring in an initial drive stage of the interface circuit cannot be prevented.

In consideration of the situation described above, the present invention is aiming at providing an interface circuit capable of preventing malfunction or an unexpected circuit operation state from occurring in an initial drive stage as well as a display device capable of preventing a distorted video from being displayed in an initial drive stage.

Means for Solving the Problems

In order to solve the above-mentioned problem, an interface circuit of the present invention includes:

a data supply unit;

a differential signal transmission unit that converts a signal received from the data supply unit to a pair of differential signals and transmits the pair of differential signals through a transmission path, the differential signal transmission unit being started in accordance with a start signal received from the data supply unit, potential levels of the differential signals outputted from the differential signal transmission unit stabilizing after a prescribed period of time from the start signal;

a differential signal reception unit that receives the pair of differential signals from the transmission path and converts the pair of differential signals to a signal to be processed by a subsequent circuit;

a data processing unit that processes a signal originating from the signal outputted by the differential signal reception unit; and a control unit that performs control such that the data processing unit does not process a signal that is based on the pair of differential signals outputted from the differential signal transmission unit during the prescribed period of time.

According to the above configuration, the differential signal transmission unit is driven by a start signal that is inputted from the data supply unit, and the output of a potential level of the differential signal stabilizes after the prescribed period from the start signal.

Therefore, the differential signal transmission unit is in an unstable state before passing the prescribed period, and the differential signal pair that is outputted from the differential signal transmission unit during such an unstable state is unstable and susceptible to noise.

Thus, if the differential signal pair outputted from the differential signal transmission unit during such an unstable state is subjected to data processing and used in a conventional manner, malfunction or an unexpected circuit operation state may occur.

On the other hand, the configuration according to the present invention includes a control unit that performs control in such a manner that a data processing operation of the data processing unit is not performed on a signal based on the differential signal during the prescribed period (differential signal in an unstable state).

Therefore, the signal that is outputted from the differential signal transmission unit during an unstable state is unstable and highly susceptible to noise, and such a signal is not subjected to data processing in the data processing unit to be outputted.

Thus, according to the above-mentioned configuration, an interface circuit capable of preventing malfunction or an unexpected circuit operation state from occurring in an initial drive can be achieved.

In order to solve the above-mentioned problem, a display device of the present invention includes the interface circuit, and a video signal included in the signal received from the data supply unit.

According to the above configuration, a display device capable of preventing a distorted video from being displayed in an initial drive stage can be achieved.

Effects of the Invention

As described above, the interface circuit of the present invention includes the differential signal output unit that is driven by a start signal inputted from the data supply unit, and the output of a potential level of the differential signal stabilizes after a prescribed period from the start signal, the data processing unit that performs data processing on signals converted in the differential signal reception unit, and the control unit that performs control in such a manner that a data processing operation of the data processing unit is not performed on a signal based on the differential signal during the prescribed period.

Thus, an interface circuit capable of preventing malfunction or an unexpected circuit operation state from occurring in an initial drive stage and a display device capable of preventing a distorted video from being displayed in an initial drive stage can be achieved.

DETAILED DESCRIPTION OF EMBODIMENTS

An embodiment of the present invention will be explained in detail below with reference to figures. However, dimensions, materials, shape, and their relative arrangement of component parts set forth herein describe one embodiment only and are not intended to limit the scope of the present invention.

In the following embodiment, a liquid crystal device is used as, but not limited to, an example of a display device including an interface circuit where a video signal is transmitted by a small amplitude differential signal. A signal transmitted by the small amplitude differential signal is not limited to the video signal and a display device is also not limited to the liquid crystal display device. For instance, the display device may be an organic EL display device provided with a display panel that emits light on its own.

Further, an amplitude and a center potential of the small amplitude differential signal explained below can be set appropriately for each individual device and a terminating resistance value provided with the reception side of the interface circuit processing the small amplitude differential signal can be set appropriately for each individual device.

[Embodiment 1]

The first embodiment of the present invention will be explained in detail below with reference to FIGS. 1 to 4.

Figure 1:
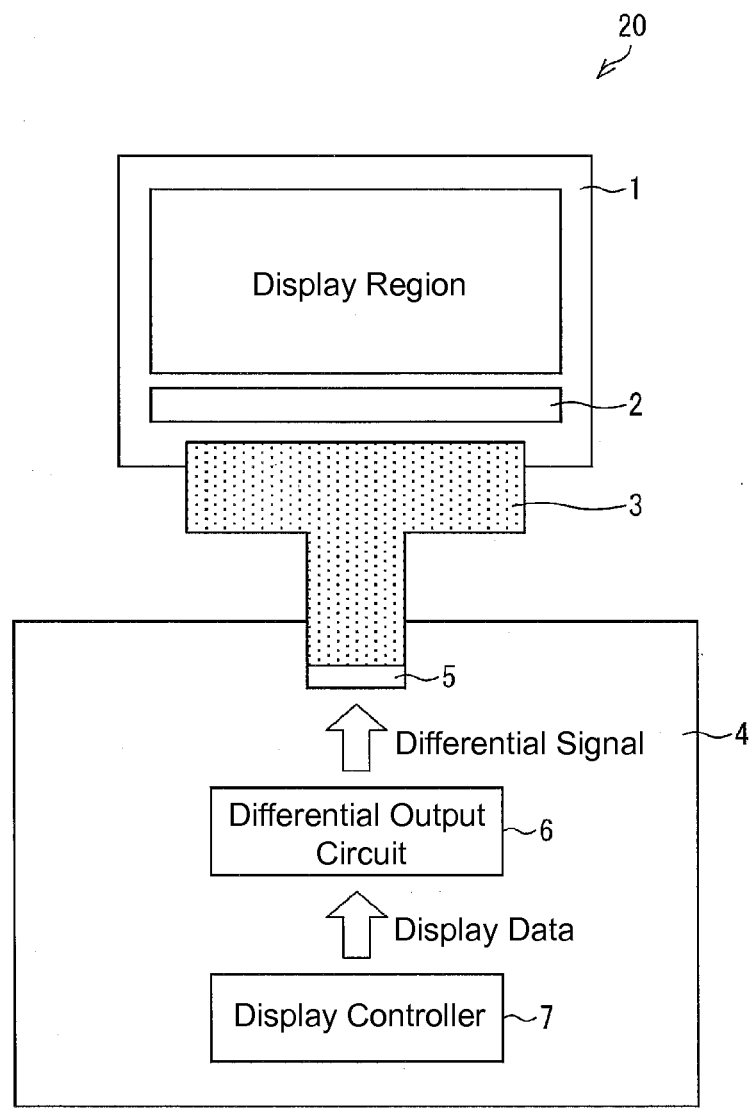
FIG. 1 is a diagram illustrating a schematic configuration of a liquid crystal display device provided with an interface circuit that transmits a video signal by a small amplitude differential signal according to the first embodiment of the present invention.

FIG. 1 is a diagram illustrating a schematic configuration of a liquid crystal display device 20 that includes an interface circuit transmitting a video signal by a small amplitude differential signal.

As shown in the diagram, the liquid crystal display device 20 includes a liquid crystal display panel 1, an FPC unit 3 as an interface unit transmitting a video signal by the small amplitude differential signal, an external substrate 4, and a backlight (not shown) arranged behind the liquid crystal display panel 1.

The liquid crystal display panel 1 includes a circuit forming region 2 having a scan signal line driving circuit (not shown), a data signal line driving circuit (not shown), and a differential input circuit (not shown) that has a data signal line driving circuit (not shown), a data processing circuit (not shown), and a counter circuit (not shown).

On the other hand, the external substrate 4 includes a connector 5, a differential output circuit (differential signal transmission unit) 6, and a display controller (data supply unit) 7.

A video signal (display data) that is outputted from the display controller 7 is converted to a differential signal with a small amplitude in the differential output circuit 6 and is transmitted to the differential reception circuit arranged on a part of the circuit forming region 2 on the liquid crystal display panel 1 side via the connector 5 and the FPC unit 3.

Figure 2:
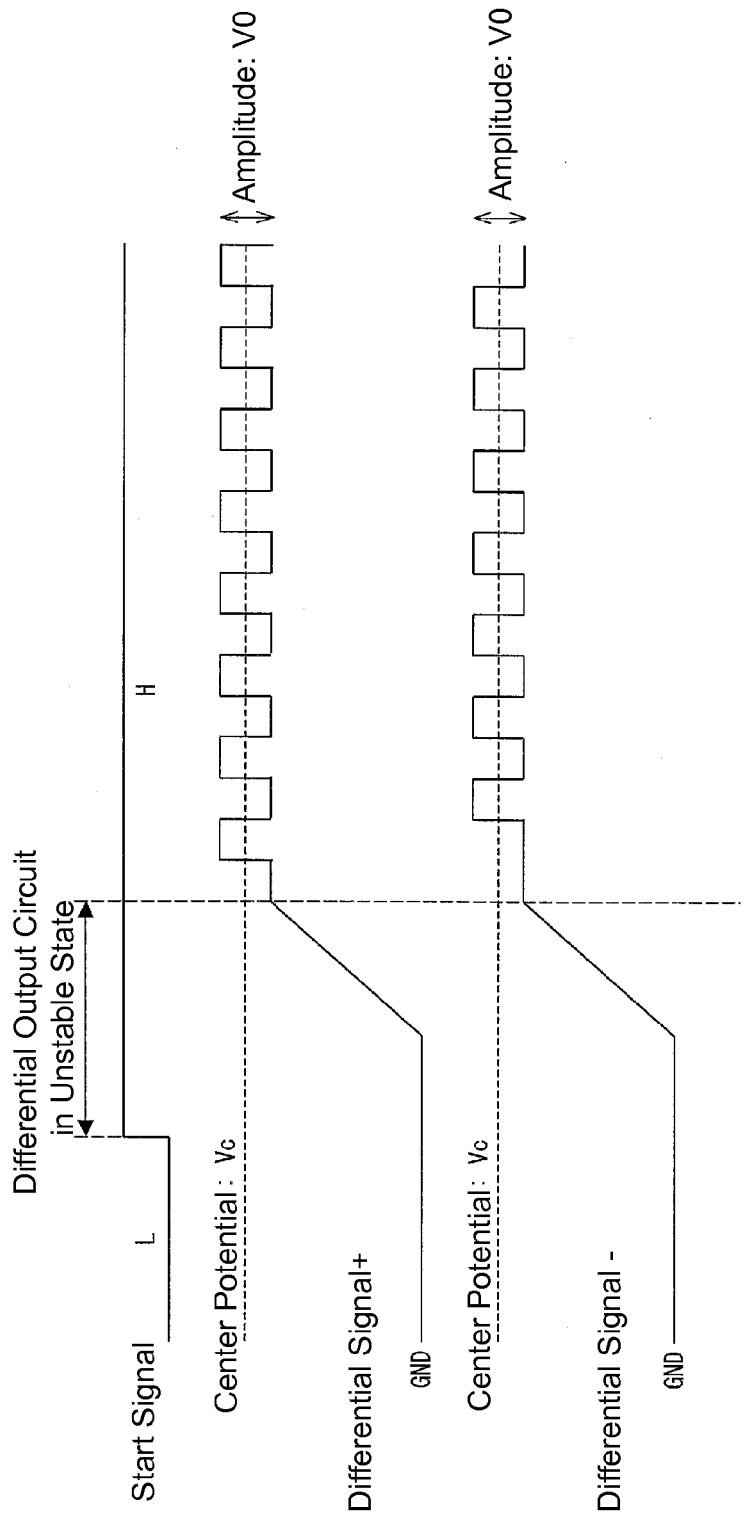
FIG. 2 is a diagram illustrating a start signal that is outputted to a differential output circuit from a display controller provided with the liquid crystal display device according to the first embodiment of the present invention and an example of a differential signal pair that is outputted from the differential output circuit.

FIG. 2 shows an example of a start signal that is outputted to the differential output circuit 6 from the display controller 7 and a differential signal pair that is outputted from the differential output circuit 6.

As shown in the diagram, when the start signal outputted to the differential output circuit 6 from the display controller 7 is "L", the differential signal pair (differential signal + & differential signal −) is not outputted and is in a state of GND level (or HiZ), however, when the start signal becomes "H", operation of the differential output circuit 6 begins and output of the differential signal starts.

Further, in this embodiment, a potential level of the differential signal pair (differential signal + & differential signal −) is set so as not to include a ground potential level (GND level).

As shown in the diagram, a center potential Vc of the differential signal pair (differential signal + & differential signal −) is set higher than the GND level and the amplitude of the differential signal pair (differential signal + & differential signal −) is set at V0.

Thus, the differential output circuit 6 starts to be driven when the start signal outputted to the differential output circuit 6 from the display controller 7 becomes "H". A prescribed period is required until the potential level of the differential signal becomes available for output.

Thus, after transitioning through an unstable state during an initial drive stage, the differential output circuit 6 reaches a stable state in which the potential level of the differential signal becomes available for output. However, the differential signal that is outputted during the unstable state tends to be unstable and susceptible to noise.

When the differential signal pair outputted from the differential output circuit 6 during such an unstable state is subjected to data processing and used in a conventional manner, malfunction or an unexpected circuit operation state may occur. Thus, a distorted video may be displayed on the liquid crystal display device that includes the interface circuit transmitting the video signal by the small amplitude differential signal in an initial drive stage.

The liquid crystal display device 20 according to this embodiment includes a control unit (described in detail later) that controls the data processing operation of the data processing circuit in such a manner that only the differential signal pair outputted from the differential output circuit 6 during a stable state is outputted via the data processing circuit.

Figure 3:
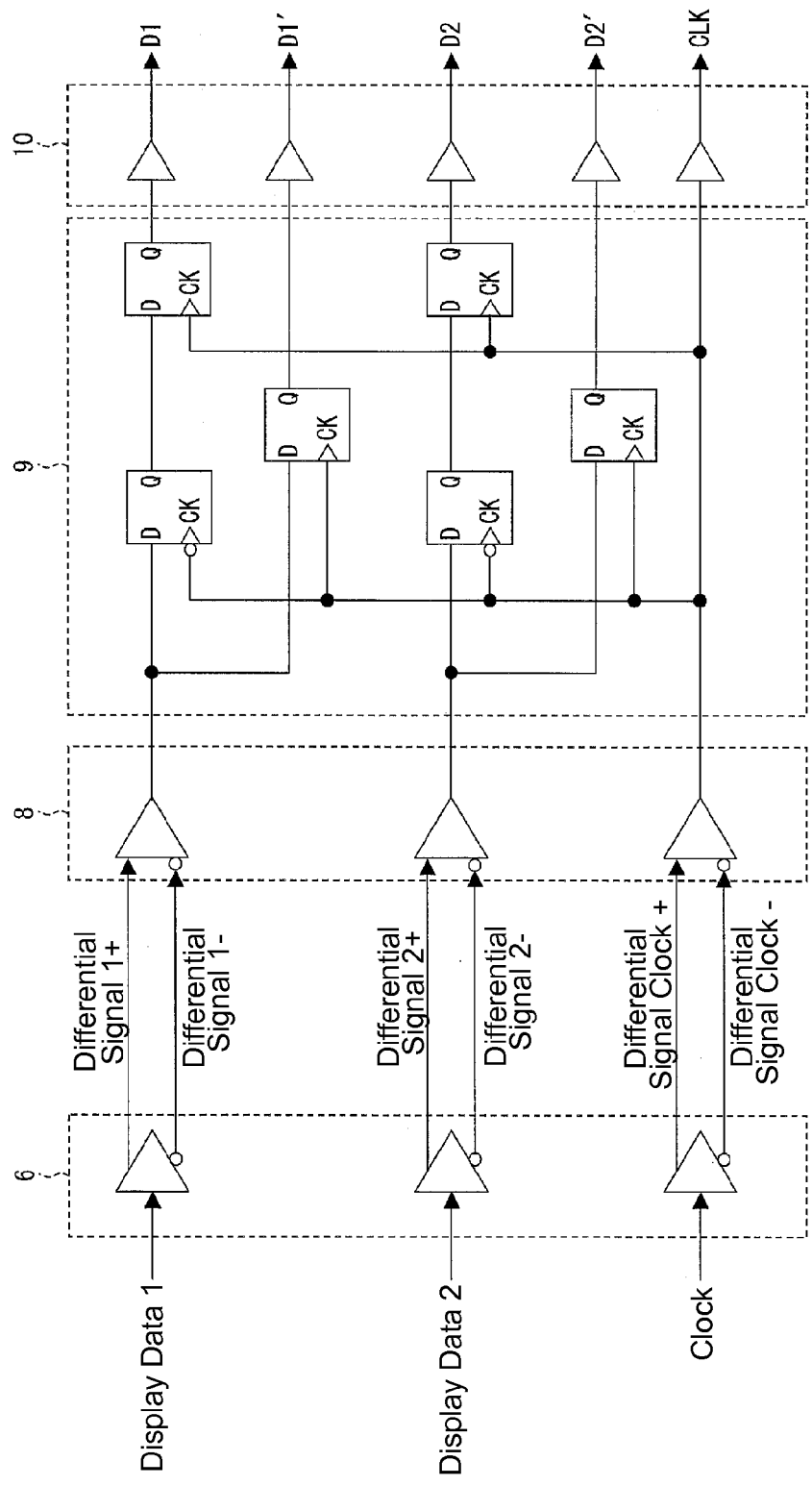
FIG. 3 is a diagram illustrating a differential input circuit, a latch circuit, and a buffer circuit provided with a data signal line drive circuit of the liquid crystal display device according to the first embodiment of the present invention.

FIG. 3 is a diagram illustrating a differential input circuit 8, a latch circuit 9, and a buffer circuit 10 that are provided with the differential reception circuit arranged on a part of the circuit forming region 2 of the liquid crystal display device 20.

As shown in the diagram, the differential signal pair of display data 1 (differential signal 1 + & differential signal 1 −), the differential signal pair 2 of display data 2 (differential signal 2 + & differential signal 2 −) and the differential signal pair of a clock (differential signal clock + & differential signal clock −) that are outputted from the differential output circuit 6, are inputted to the differential input circuit 8 (differential signal reception unit).

This embodiment includes, but is not limited to, two signal lines for transmission of the display data and one signal line for the clock transmission. The number of signal lines for data transmission can be increased appropriately if the liquid crystal display device 20 is equipped with high resolution.

In the differential input circuit 8, each of the inputted differential signal pairs (differential signal 1 + & differential signal 1 −, differential signal 2 + & differential signal 2 −, and differential signal clock + & differential signal clock −) is converted to the signal format of the display data 1, the display data 2 and the clock that is inputted to the differential output circuit 6, and is subsequently outputted to the latch circuit 9.

Further, at this time, a level conversion is performed to convert the output signal to a logic amplitude VLOG of the inside of each circuit provided with the circuit forming region 2, if necessary.

The latch circuit 9 is configured from a plurality of D-flip flops to incorporate the display data.

The signal that is outputted from the differential input circuit 8 with respect to the display data 1 is divided into a signal D1 that is outputted via a negative-edge-triggered D flip-flop, a positive-edge-triggered D flip-flop and a buffer in the buffer circuit 10 as well as a signal D1' that is outputted via the positive-edge-triggered D flip-flop and the buffer in the buffer circuit 10.

The signal that is outputted from the differential input circuit 8 with respect to the display data 2 is divided into a signal D2 that is outputted via the negative-edge-triggered D flip-flop, the positive-edge-triggered D flip-flop and the buffer in the buffer circuit 10 as well as a signal D2' that is outputted via the positive-edge-triggered D flip-flop and the buffer in the buffer circuit 10.

Then, the clock signal that is outputted from the differential input circuit 8 is outputted as a clock signal CLK, via the buffer in the buffer circuit 10.

As shown in this embodiment, if the interface circuit that performs transmission by the small amplitude differential signal is provided and high speed operation is required, it is preferable that the buffer circuit 10 is provided to perform phase adjustment among each signal (specifically, the clock signal and the display data).

Although, in this embodiment, a case of incorporating data from both the positive edge and the negative edge is used as an example, data may be incorporated from either the positive edge or the negative edge and in such a case, an applicable D-flip flop can be omitted.

Figure 4:
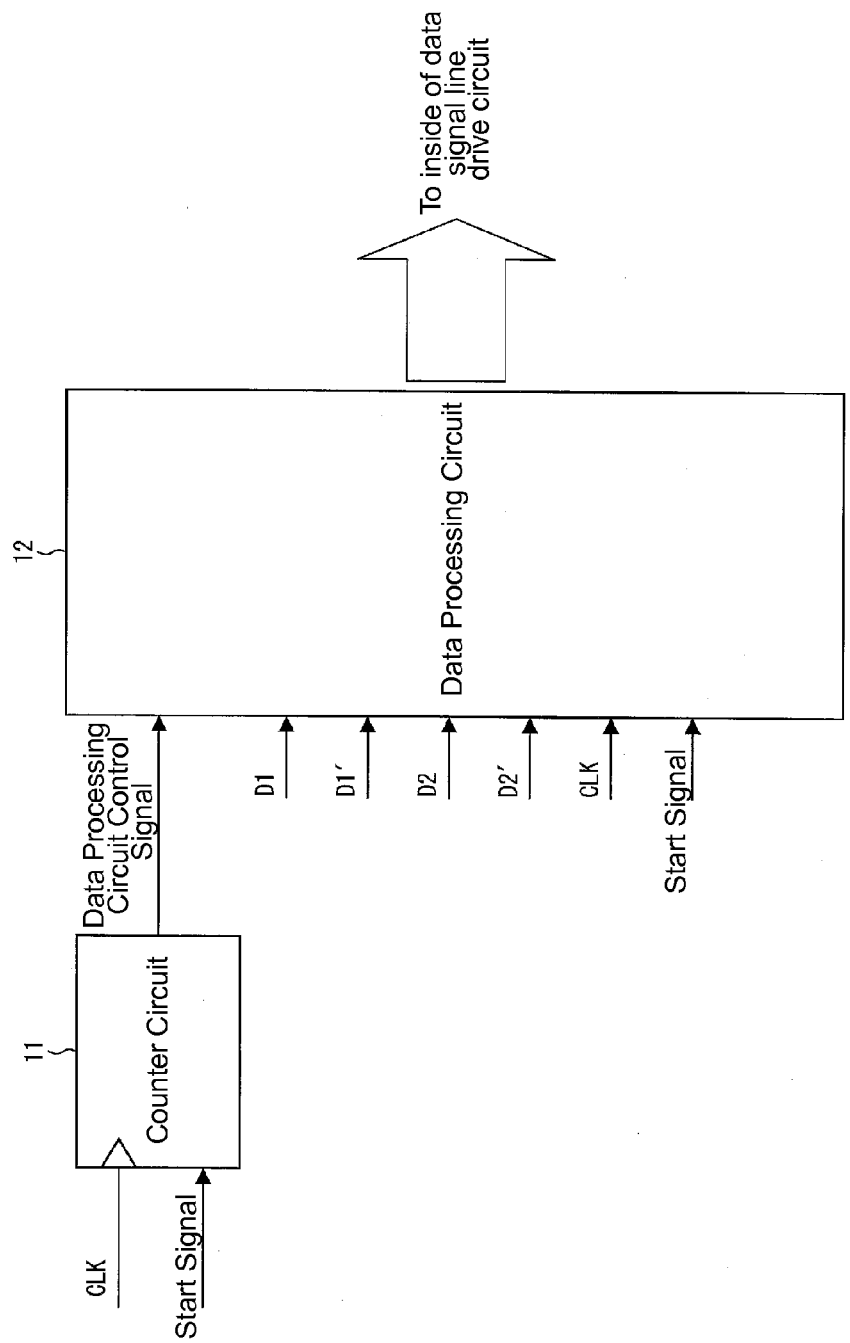
FIG. 4 is a diagram illustrating a schematic configuration of a counter circuit and a data processing circuit provided with the data signal line drive circuit of the liquid crystal display device according to the first embodiment of the present invention.

FIG. 4 is a diagram illustrating a schematic configuration of a counter circuit 11 and a data processing circuit 12 that are provided with the differential reception circuit of the circuit forming region 2 on the liquid crystal display panel 1 side.

As shown in the diagram, in the counter circuit 11, the start signal outputted to the differential output circuit 6 from the display controller 7 shown in FIG. 2 and the clock signal CLK are inputted to the counter circuit 11.

Further, the counter circuit 11 counts the clock signal CLK when the start signal becomes "H", i.e., when the differential output circuit 6 starts to be driven. At this time, the number of clocks to be counted refers to the number of clocks during the period when the differential output circuit 6 shown in FIG. 2 is in an unstable state.

After counting the prescribed number of clocks, the counter circuit 11 outputs a data processing circuit control signal to the data processing circuit 12 using the start signal as a starting point.

After receiving the data processing circuit control signal, the data processing circuit 12 starts a conversion operation based on a serial signal received from the buffer circuit 10 (signal D1, signal D1', signal D2, and signal D2') to convert to 24 bit parallel signals such as VS (vertical synchronization signal), HS (horizontal synchronizing signal), R (red) display data, G (green) display data and B (blue) display data, for example.

Therefore, the data processing circuit 12 according to this embodiment can suppress the issue of starting the circuit operation during an unstable serial signal state leading to an unexpected circuit operation state.

Moreover, the data processing circuit 12 may be set so as to force a data line provided with the liquid crystal display panel 1 via the data signal line drive circuit to output, for example, a data signal line drive signal which corresponds to a black data before reception of the data processing circuit control signal and output the data signal line drive signal based on the input display data after the reception of the data processing circuit control signal.

Further, the signal that is outputted to the data line provided with the liquid crystal display panel 1 via the data signal line drive circuit before the reception of the data processing circuit control signal may be a prescribed image data, for example, and is not limited to the data signal line drive signal corresponding to the black data.

When the differential output circuit 6 is in an unstable state, i.e., if the CLK signal outputted from the differential output circuit 6 uses the counter circuit 11 during an unstable state, the operation of the counter circuit 11 is also unstable. Accordingly, if the CLK signal outputted from the differential output circuit 6 is in an unstable state, the counter operation may become faster or slower than anticipated.

Even if the counter operation is faster than anticipated, it is necessary to set the number of counts so that an initial operation of the data processing circuit 12 can avoid a period of an unstable state of the differential signal.

Moreover, even if the counter operation is slower than anticipated, consideration should be given so that no problem arises from delay of the initial operation of the data processing circuit 12 during video display.

The use of the above configuration achieves an interface circuit capable of preventing malfunction from occurring in an initial drive stage and a liquid crystal display device capable of preventing a distorted video from being displayed in an initial drive stage.

[Embodiment 2]

Next, the second embodiment of the present invention will be explained in detail with reference to FIG. 5. The liquid crystal display device 20 of Embodiment 1 includes the counter circuit 11 as a control unit controlling the data processing operation of the data processing circuit 12. In this embodiment, unlike Embodiment 1, an RC circuit 13 is provided as a control unit controlling the data processing operation of the data processing circuit 12 in place of the counter circuit 11, and the other configurations are as have been explained in Embodiment 1. For convenience of explanation, the same numerical references are given to the members having the same functions as the members shown in the figures of Embodiment 1 and their explanations are omitted.

Figure 5:
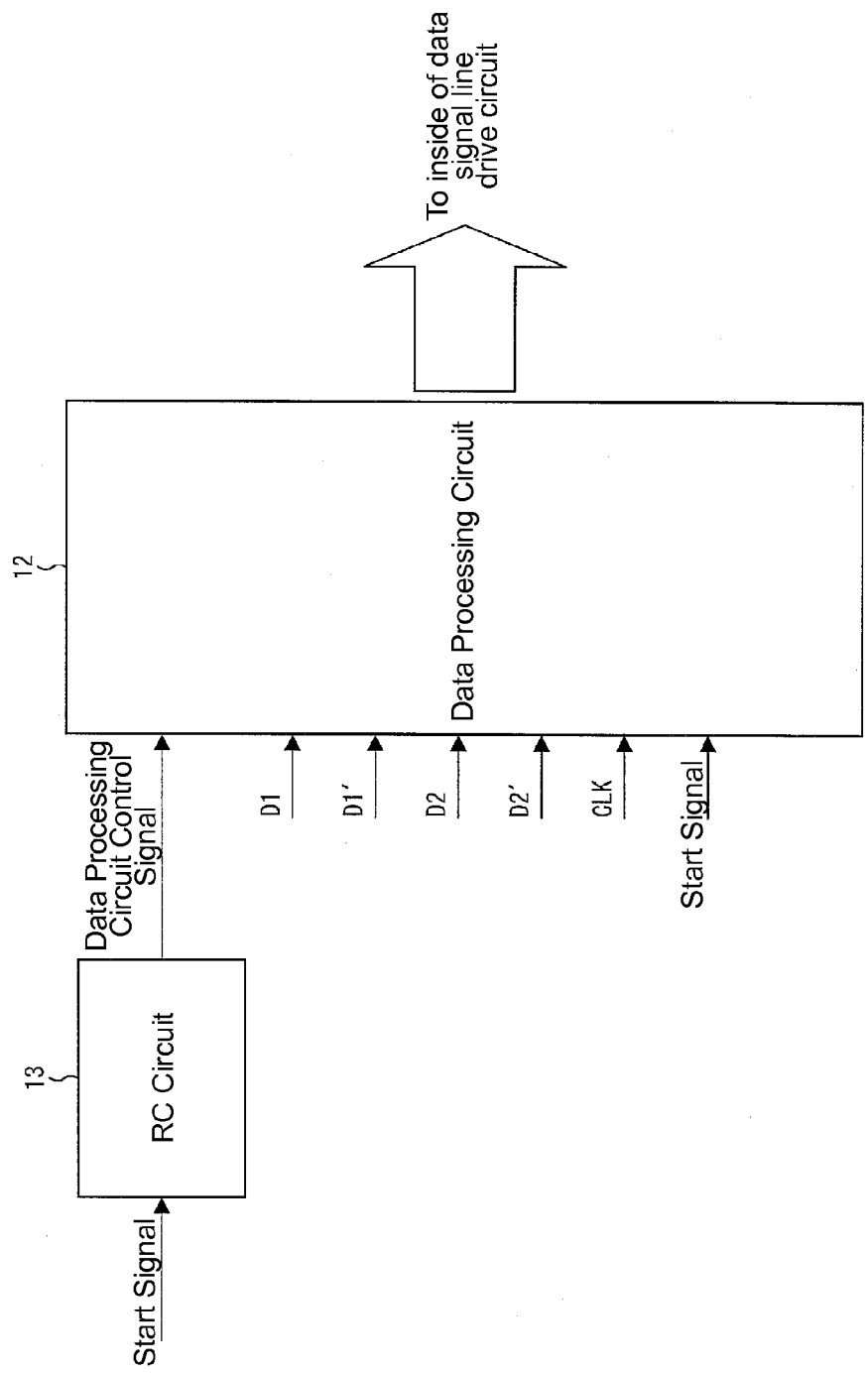
FIG. 5 is a diagram illustrating a data processing circuit and an RC circuit provided with a liquid crystal display device according to the second embodiment of the present invention.

FIG. 5 is a diagram illustrating the data processing circuit 12 and an RC circuit 13 that is provided as a control unit of the data processing operation of the data processing circuit 12.

As shown in the diagram, the start signal outputted to a differential output circuit 6 from the display controller 7 shown in FIG. 2 and subsequently inputted to the RC circuit 13 can delay the time to become "H" by increasing a time constant τ=R×C in the RC circuit 13.

An increase of the value of the time constant, τ by the amount of time that the differential output circuit 6 is in an unstable state will delay the amount of time the start signal becomes "H", then the data processing circuit control signal, which is a control signal that outputs the signals the data processing circuit 12 received from the buffer circuit 10, signal D1, signal D1', signal D2 and signal D2' to the data line provided with the liquid crystal display device, is outputted to the data processing circuit 12.

Thus, according to the above configuration, control is performed so that the data processing circuit 12 will not carry out an operation in the state of a signal composed of the differential signal pair that is outputted from the differential output circuit 6 during an unstable state and therefore is susceptible to noise.

The use of the above configuration can achieve an interface circuit capable of preventing malfunction from occurring in an initial drive stage and a liquid crystal display device capable of preventing a distorted video from being displayed in an initial drive stage.

[Embodiment 3]

Next, the third embodiment of the present invention will be explained in detail with reference to FIG. 6. The liquid crystal display devices of Embodiments 1 and 2 include the counter circuit 11 and the RC circuit 13 as a control unit controlling data processing operation of the data processing circuit 12. In this embodiment, unlike Embodiments 1 and 2, a monostable multivibrator (one-shot multivibrator) 14 is provided as a control unit controlling the data processing operation of the data processing circuit 12 in place of the counter circuit 11 and RC circuit 13, and other configurations have been explained in Embodiment 1. For convenience of explanation, the same numerical references are given to the members having the same functions as the members shown in the figures of Embodiments 1 and 2 and their explanations are omitted.

Figure 6:
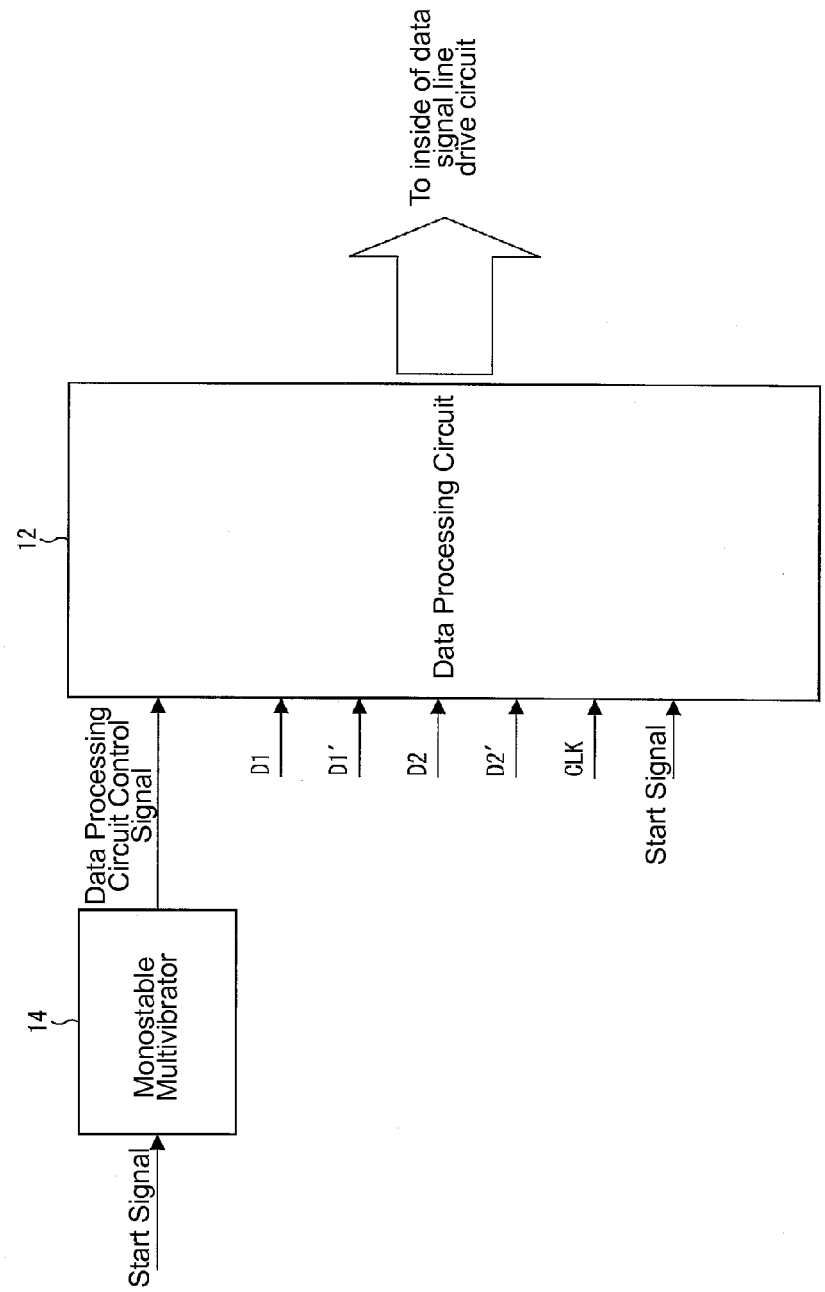
FIG. 6 is a diagram illustrating a data processing circuit and a monostable multivibrator provided with a liquid crystal display device according to the third embodiment of the present invention.
Figure 7:
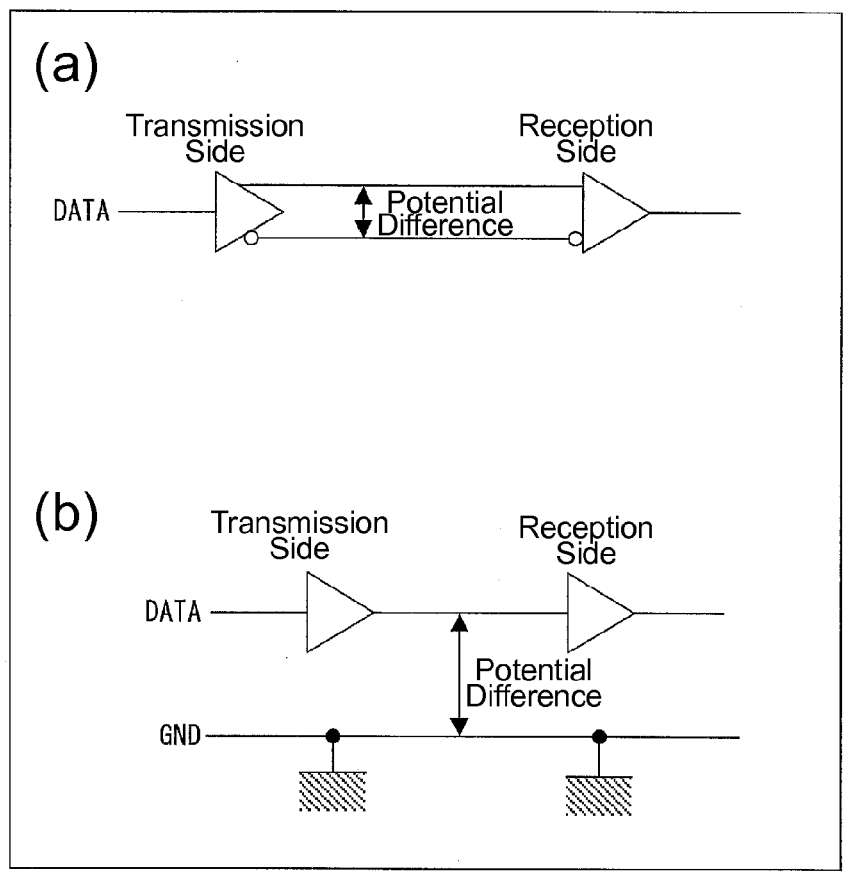
FIG. 7 is a diagram illustrating schematic configurations of interface circuits employing a differential signal method and a single ended signal method.
Figure 8:
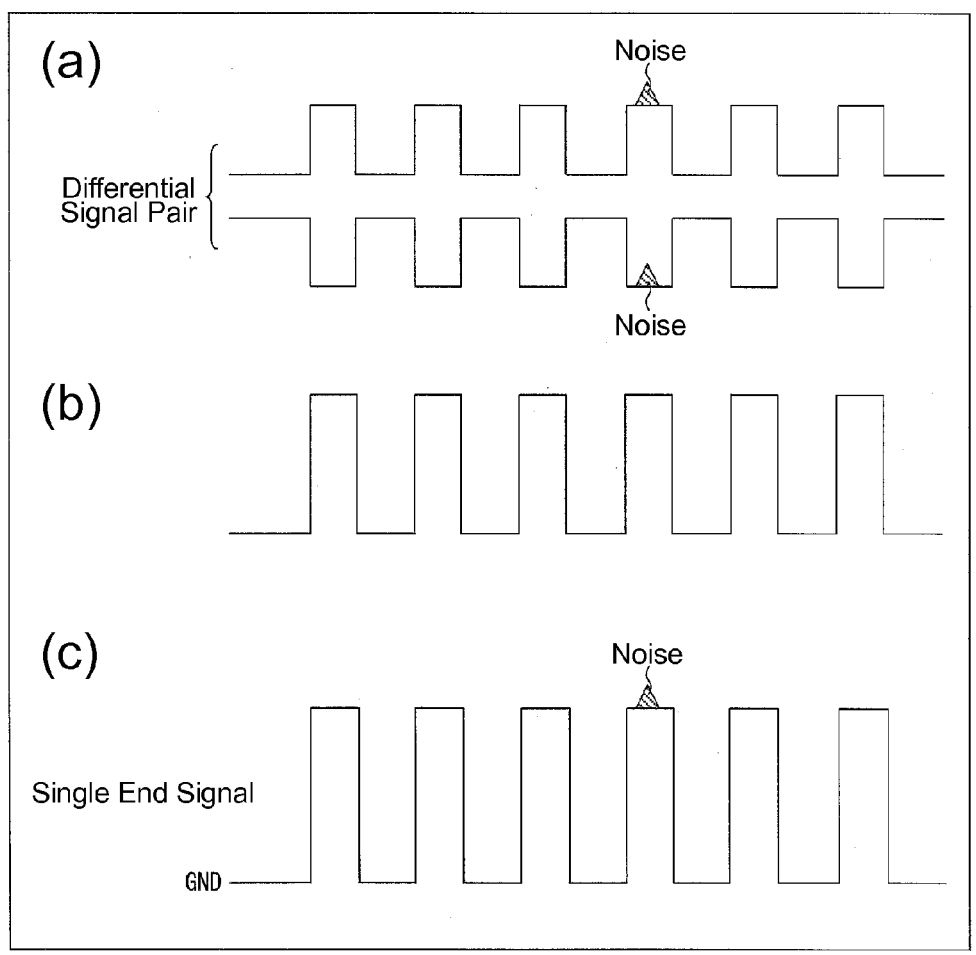
FIG. 8 is a diagram illustrating an example of the differential signal method and the single ended signal method.

FIG. 6 is a diagram illustrating the data processing circuit 12 and the monostable multivibrator 14 provided as a control unit controlling the data processing operation of the data processing circuit 12.

The monostable multivibrator (one-shot multivibrator) 14 has a characteristic of providing an "H" output for a certain period of time which is determined by an integrating circuit composed of the resistor (R) and the capacitor (C) when the level of an input terminal changes from "L" to "H" (or from "H" to "L") with input of a trigger pulse.

In this embodiment, an output signal of the one shot multivibrator 14 is inputted to the data processing circuit 12 via an inverter (not shown) using such a characteristic.

In such a configuration, when the level of the input signal of the one shot multivibrator 14 changes from "L" to "H", i.e. when the start signal outputted to the differential output circuit 6 from the display controller 7 shown in FIG. 2 becomes "H", even though the output signal of the one shot multivibrator 14 provides an "H" output for a certain period of time which is determined by the integrating circuit composed of the resistor (R) and the capacitor (C), the output is performed via an inverter and thus an "L" level signal is inputted as a data processing circuit control signal.

After the above period of time, an "H" level signal is inputted to the data processing circuit 12 as the data processing circuit control signal.

The values of the resistor (R) and the capacitor (C) for the integrating circuit composed of the resistor (R) and the capacitor (C) in the one shot multivibrator 14 may be set considering the amount of time that the differential output circuit 6 is in an unstable state.

Thus, according to the above configuration, control is performed so that the data processing circuit 12 will not carry out an operation in the state of signals composed of the differential signal pair that are outputted from the differential output circuit 6 during an unstable state and therefore is susceptible to noise.

The use of the above configuration can achieve an interface circuit capable of preventing malfunction from occurring in an initial drive stage and a liquid crystal display device capable of preventing a distorted video from being displayed in an initial drive stage.

(Summary)

According to the interface circuit of the present invention, any of the differential signal pairs may be configured of a potential level different from the ground potential level.

According to the above configuration, because any of the differential signal pairs may be configured of a potential level different from the ground potential level, the present invention can preferably be used for the differential signal transmission unit in which an output of the potential level of the differential signal takes time to reach a stable state from an unstable state in an initial drive stage.

In the interface circuit of the present invention, it is preferable that the differential signal reception unit include the control unit.

According to the above configuration, because the differential signal reception unit includes the control unit, an interface circuit capable of adjusting control signals with ease can be achieved.

In the interface circuit of the present invention, the data processing unit may be configured to start data processing of a signal outputted from the differential signal transmission unit after the prescribed period, once a first control signal is outputted from the control unit.

In the interface circuit of the present invention, the data processing unit may be configured to output a pre-determined prescribed signal that is not based on the differential signal outputted from the differential signal transmission unit until the first control signal is outputted from the control unit.

In the interface circuit of the present invention, the control unit may include a counter circuit.

According to the above configuration, having the counter circuit can achieve an interface circuit capable of preventing malfunction from occurring in an initial drive stage relatively easily.

In the interface circuit of the present invention, the control unit may include an RC circuit.

According to the above configuration, having the RC circuit in the control unit can achieve an interface circuit capable of preventing malfunction from occurring with relative ease in an initial drive stage.

In the interface circuit of the present invention, the control unit may include a monostable multivibrator in the control unit.

According to the above configuration, having the monostable multivibrator can achieve an interface circuit capable of preventing malfunction from occurring with relative ease in an initial drive stage.

The display device of the present invention may have a configuration provided with a display panel and an external substrate electrically connected with the display panel via the transmission path. The display panel may be provided with the differential signal reception unit and the data processing unit and the control unit, and the external substrate may be provided with the data supply unit and the differential signal transmission unit.

According to the above configuration, in the display device having the differential signal transmission unit on the external substrate side as well as the differential signal reception unit on the display panel side and transmitting the video signal with the differential signal method, a distorted video can be prevented from being displayed in an initial drive stage.

In the display device of the present invention, the display panel may be a liquid crystal display panel.

According to the above configuration, in the display device having the liquid crystal display panel, a distorted video can be prevented from being displayed in an initial drive stage.

In the display device of the present invention, the display panel may be a display panel that emits light on its own.

According to the above configuration, in the display device having the display device that emits light on its own (for example, an organic EL display panel), a distorted video can be prevented from being displayed in an initial drive stage.

In the display device of the present invention, the display panel may include a data signal line, and data that is outputted from the data processing unit may be inputted to a data signal line drive circuit that outputs the data to the data signal line.

According to the above configuration, because the data inputted to the data signal line drive circuit is based on the signal outputted from the differential signal transmission unit in a stable state after the prescribed period, a display device capable of preventing a distorted video from being displayed in an initial drive stage can be achieved.

In the display device of the present invention, data processing in the data processing unit may include a conversion process converting a serial signal to a parallel signal.

According to the above configuration, a display device capable of preventing a distorted video from being displayed in an initial drive stage can be achieved.

The present invention is not limited to the above embodiments and various modifications can be made within the scope described in claims and embodiments obtained by appropriately combining respective technical means set forth in the different embodiments are also included in the technical scope herein.

INDUSTRIAL APPLICABILITY

The invention can be preferably used in a interface circuit for small amplitude differential signal processing and a display device having the same.

DESCRIPTION OF REFERENCE CHARACTERS 1 liquid crystal display panel (display panel)
2 circuit forming region
3 FPC unit (transmission path)
4 external substrate
5 connector (transmission path)
6 differential output circuit (differential signal transmission unit)
7 display controller (data supply unit)
8 differential input circuit (differential signal reception unit)
9 latch circuit
10 buffer circuit
11 counter circuit (control unit)
12 data processing circuit (data processing unit)
13 RC circuit (control unit)
14 one shot multivibrator (monostable multivibrator)
20 liquid crystal display device (display device)

What is claimed is:

1. An interface circuit, comprising:
   a data supply unit;
   a differential signal transmission unit that converts a signal received from said data supply unit to a pair of differential signals and transmits said pair of differential signals through a transmission path, said differential signal transmission unit being started in accordance with a start signal received from the data supply unit, a potential levels of said differential signals outputted from the differential signal transmission unit stabilizing after a prescribed period of time from said start signal;
   a differential signal reception unit that receives said pair of differential signals from said transmission path and converts said pair of differential signals to a signal to be processed by a subsequent circuit;
   a data processing unit that processes a signal originating from said signal outputted by said differential signal reception unit; and
   a control unit that performs control such that said data processing unit does not process a signal that is based on the pair of differential signals outputted from the differential signal transmission unit during the prescribed period of time; and
   wherein said control unit includes a resistor-capacitor circuit and/or a monostable multivibrator.

2. The interface circuit according to claim 1, wherein said pair of differential signals have potential levels different from a ground potential level.

3. The interface circuit according to claim 1, wherein said control unit is included in said differential signal reception unit.

4. The interface circuit according to claim 1, wherein when a first control signal is outputted from the control unit, the data processing unit starts processing a signal that is based on the pair of differential signals outputted from the differential signal transmission unit after said prescribed period of time.

5. The interface circuit according to claim 4, wherein, until said first control signal is received from the control unit, said data processing unit outputs a prescribed signal that is not based on the pair of differential signals outputted from the differential signal transmission unit.

6. The interface circuit according to claim 1, wherein said control unit includes the resistor-capacitor circuit.

7. The interface circuit according to claim 1, wherein said control unit includes the monostable multivibrator.

8. A display device comprising:
   the interface circuit according to claim 1; and
   a video signal included in the signal received from the data supply unit.

9. The display device according to claim 8, further comprising:
   a display panel; and
   an external substrate electrically connected with said display panel via the transmission path of the interface circuit,
   wherein said display panel includes the differential signal reception unit, the data processing unit, and the control unit, and
   wherein said external substrate includes the data supply unit and the differential signal transmission unit.

10. The display device according to claim 9, wherein said display panel is a liquid crystal display panel.

11. The display device according to claim 9, wherein said display panel is a display device that emits light by itself.

12. The display device according to claim 9,
   wherein said display panel includes a data signal line, and
   wherein data received from said data processing unit is inputted to a data signal line drive circuit that outputs data to said data signal line.

13. The display device according to claim 8, wherein data processing in said data processing unit includes a conversion process that converts a serial signal to a parallel signal.

* * * * *